United States Patent [19]

Quock et al.

[11] Patent Number: 4,639,312
[45] Date of Patent: Jan. 27, 1987

[54] FILTER PRESS FLOW CONTROL SYSTEM FOR DEWATERING SLUDGE

[75] Inventors: Deborah E. R. Quock, Houston; Timothy L. Triplett, Missouri City; Don E. Childress, Houston, all of Tex.

[73] Assignee: Texaco Inc., White Plains, N.Y.

[21] Appl. No.: 783,720

[22] Filed: Oct. 3, 1985

[51] Int. Cl.$^4$ ............................................. B01D 25/12
[52] U.S. Cl. .................... 210/101; 210/102; 210/104; 210/138; 210/224
[58] Field of Search ............... 210/741, 744, 101, 102, 210/104, 134, 138, 106, 111, 96.1, 224, 225

[56] References Cited

U.S. PATENT DOCUMENTS

| | | | |
|---|---|---|---|
| 3,549,521 | 12/1970 | Stevens | 210/101 |
| 4,067,807 | 1/1978 | Busse et al. | 210/741 |
| 4,439,325 | 3/1984 | Blais | 210/224 |
| 4,514,306 | 4/1985 | Pato | 210/741 |

Primary Examiner—John Adee
Attorney, Agent, or Firm—Jack H. Park; Kenneth R. Priem; Richard A. Morgan

[57] ABSTRACT

A control system has been invented for feeding settled sludge to two filter presses without the use of a surge tank. The system provides for constant feed rates from a solids settling tank, even as filter press capacity decays and the filter press is taken off stream for dumping. This is accomplished by providing two modes of operation. The first mode provides for the feeding of a single filter press. The second mode provides control when both filter presses are fed. The second mode is actuated by elevated pressure differential across a filter press, which signals the valve to move, to bring a second filter press on line while compensating for flow rate and finally shuts down the first filter press after a timed interval.

The need for a surge drum is eliminated by maintaining continuous upstream and downstream operation of the filter presses in a sludge dewatering process.

1 Claim, 1 Drawing Figure

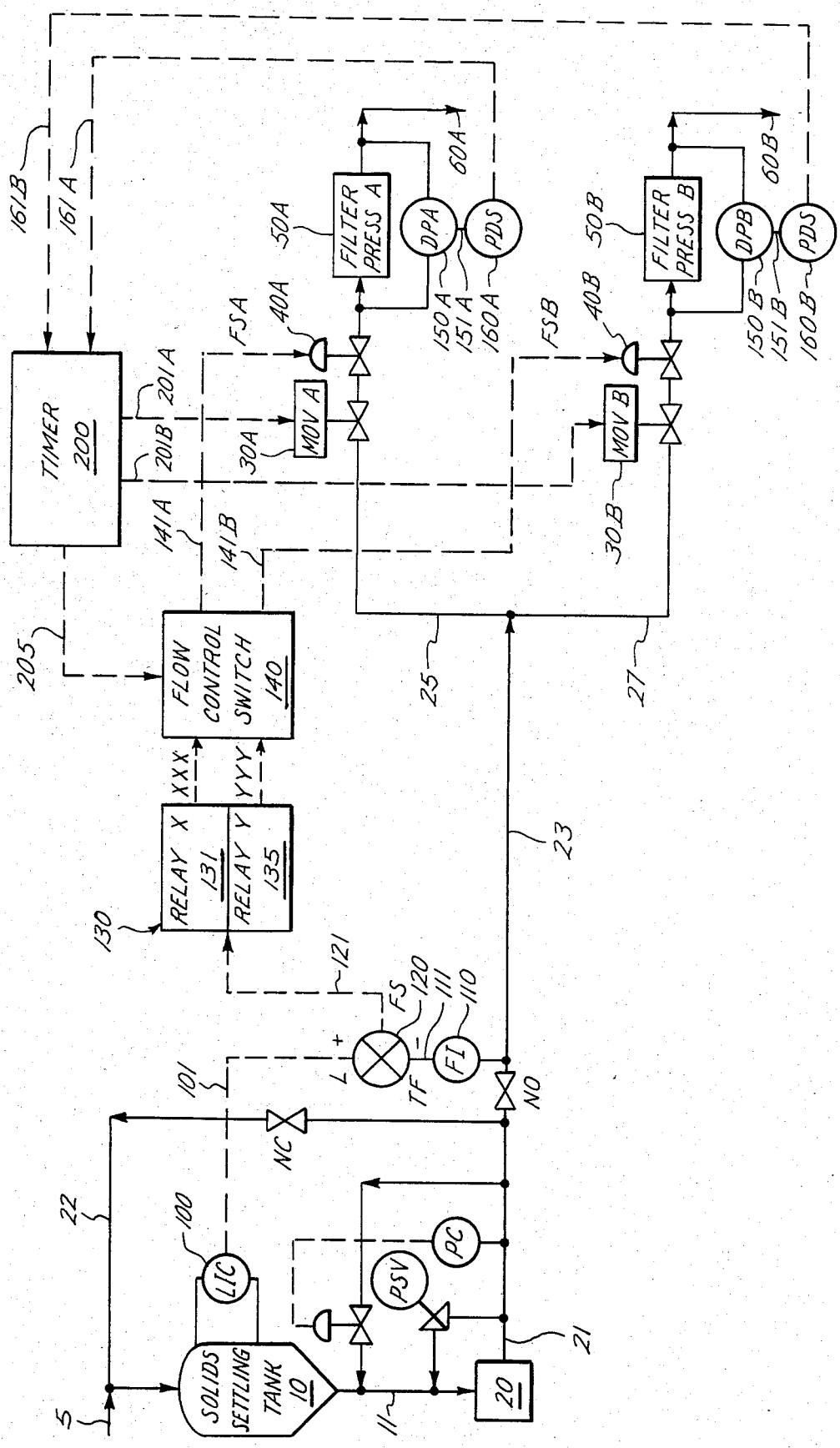

FILTER PRESS FLOW CONTROL SYSTEM FOR DEWATERING SLUDGE

BACKGROUND OF THE INVENTION

1. Field of the Invention

This invention relates to a flow control system. More particularly, this invention relates to a filter press feed flow control system for dewatering sludge in a waste water treating process.

2. Description of Relevant Systems in the Field

Disposal cost of dewatered sludge is a function of the volume of material handled. The objective of sludge dewatering is therefore to achieve a high density, low water content filter cake. This is economically achieved within the residence time constraint of available filter presses.

U.S. Pat. No. 4,067,807 describes a process for operating a filter press having a sludge feed pump and a pressure tank. A quantity of sludge is withdrawn and stored in the pressure tank under a cushion of compressed air and sludge is introduced under pressure from the pressure tank into the filter press during the charging cycle. After each filtering operation and previous to the next charge, the filter press is opened, the filter cake released and the filter cloth cleaned if necessary.

BRIEF DESCRIPTION OF THE DRAWING

In the drawing is a schematic representation of the filter press flow control system.

DETAILED DESCRIPTION OF THE DRAWING

In the drawing is a representation of a system for controlling the flow of settled solids from a solids settling tank 10 to a pair of filter presses; filter press A, 50A and filter press B, 50B. The solids settling tank 10 is supplied a slurry consisting of solids and aqueous fluids through line 5. On settling, an interface develops between settled solids and aqueous fluids. This interface is detected by a first sensor 100, a level indicator or level indicator and controller providing a signal 101 corresponding to the level, L, to flow controller 120. Settled solids are pumped from the solids settling tank 10 through line 11 and enter the suction of positive displacement pump 20 and are pumped through pump discharge line 21 and past a second sensor 110, a flow indicator which provides a signal 111 corresponding to the total flow of settled solids, TF, to flow controller 120.

Flow controller 120 provides a control valve actuating signal 121, FS, proportional or both proportional and integral to the difference between the reference input; signal 101 corresponding to level, and the feedback variable signal 111 corresponding to flow. This control valve actuating signal 121 is an input to relay means 130 comprising two amplifying relays, relay x, 131, with output signal xxx and relay y, 135, with output signal yyy. These amplifying relays amplify the control valve actuating signal such that: as the control valve actuating signal 121 varies from 0% to 50%, the output signal xxx of relay x varies linearly from 0% to 100% and the output signal yyy of relay y remains constant at 0%; and as the control valve actuating signal 121 varies from 50% to 100%, the output signal xxx of relay x remains constant at 100% and the output signal yyy of relay y varies linearly from 0% to 100%. The output signal xxx of relay x and output signal yyy of relay y are provided as input signals to flow control switch 140.

Flow control switch 140 has three inputs and two outputs signal 141A and signal 141B. Input signals xxx and yyy are provided as output signals via signals 141A and 141B. Signal 141A is the control valve A activating signal FSA. Signal 141B is the control valve B activating signal FSB. The flow control switch 140 receives a flow control switch actuating signal 205 from timer 200. On receiving a flow control switch actuating signal 205, flow control switch 140 switches signal xxx from one flow control valve to the other. Simultaneously the flow control valve which had been receiving signal xxx then receives signal yyy, via signal 141A or 141B.

The filter presses operate in two modes. In the quasi steady state mode, one motor operated valve, MOV is closed and the other open. For example, motor operated valve B, 30B is closed and motor operated valve A, 30A is open. In this case settled solids flow through lines 23 and 25, through motor operated valve A, 30A under flow control by flow control valve A, 40A. The settled solids enter filter press A, 50A and are retained on the filter cloth, while filtrate is drawn off in line 60A. Differential pressure across the filter press is measured by a third sensor, which is one of a pair of differential pressure sensors 150A and 150B, one across each filter press.

In a second mode of operation, the filter presses operate in a transition or unsteady state mode. Continuing the example, motor operated valve A, 30A is open and valve B, 30B is closed. Solids build up on the filter cloth of filter press A, 50A, causing the differential pressure to increase as indicated on differential pressure sensor 150A. Pressure switch means 160A receives as an input the differential pressure signal 151A. At a predetermined differential pressure threshold, pressure switch means 160A provides a timer actuating signal 161A.

The timer 200 immediately provides motor operated valve actuating signal 201B which causes motor operated valve B, 30B to open permitting flow of settled solids through line 27 to filter press B, 50B via flow control valve 40B as the flow control signal 121 increases above 50%; at which point 40A is fully open. In this transition mode, flow is established to both filter presses. This transition mode allows for the utilization of full capacity on filter press A, 50A while maintaining full undisrupted operation of the system.

After a predetermined time, the timer 200 provides a motor operated valve actuating signal 201A to close motor operated valve A, 40A. Simultaneously, the timer 200 provides a flow control switch actuating signal 205 to flow control switch 140. This causes signal xxx to be switched from flow control valve 40A to flow control valve 40B and signal yyy to be switched from control valve 40B to control valve 40A. At this time, the filter press is manually dumped, washed and made ready for service. Steady state mode of operation is carried on using filter press B, until the pressure differential reaches a predetermined value and the pressure switch means 160B provides a timer actuating signal 161B and the process continues.

SUMMARY OF THE INVENTION

A system controls the flow of settled solids from a solids settling tank to and between a pair of filter presses. In the solids settling tank, sludge is settled into settled solids and aqueous fluids. An interface is sensed by a first sensor providing a reference input to a flow controller. Settled solids are pumped to a pair of filter presses, the total flow sensed by a second sensor providing a feedback variable to the flow controller. The flow controller provides a flow control valve actuating signal proportional to the difference between the reference input and the feedback variable.

A relay means receives as an input the flow control valve actuating signal and provides signals xxx and yyy from amplifying relays as outputs to a flow control switch. The amplifying relays adjust the respective signals such that as the control valve actuating signal varies from 0% to 50%, signal xxx varies linearly from 0% to 100% and signal yyy remains constant at 0%. As the control valve actuating signal varies from 50% to 100%, signal xxx remains constant at 100% and signal yyy varies linearly from 0% to 100%. When the flow control switch receives as an input a flow control switch actuating signal, the signal to the pair of valves is switched.

A pair of differential pressure sensors senses pressure drop across each filter press and provides a corresponding signal to pressure switch means when a predetermined differential pressure is reached. At that time, the pressure switch means provides a timer actuating signal to the timer. The timer provides the signal to open the closed motor operated valve. Settled solids flow to both filter presses for a predetermined time. After the predetermined time, the motor operated valve to the filter press actuating the pressure switch means is closed allowing for service of the filter press. Simultaneously, the timer provides the flow control switch actuating signal.

DESCRIPTION OF THE PREFERRED EMBODIMENTS

Sludge dewatering filter presses are typically fed settled solids from a surge drum. A surge drum must have enough capacity to hold settled solids in order to rapidly fill a filter press and then to accumulate settled solids as the filter press capacity decays. The system is controlled to maintain a constant pressure drop across the filter plates by reducing flow rate to the filter press. In this manner both a high density cake and a clear filtrate are produced.

In order to reduce the handling of abrasive, coagulated settled solids, it was decided to attempt to remove the surge drum from the process. To accomplish this, it was necessary to devise a new control scheme to feed settled solids, directly from the solids settling tank to two filter presses. The two filter presses are alternated in service. While one is being fed, the other is being dumped and rinsed. The process requires that settled solids be discharged from the tank bottom at the same rate as sludge enters the solids settling tank in order to maintain tank level. Further, there must be no recycle to the solids settling tank which might disrupt the settling of solids from aqueous fluids.

Accordingly, the system control scheme of the present invention was devised. Under quasi steady state operation the settling tank level control cascades to control total flow rate to a single filter press. When a predetermined pressure drop is reached, a signal actuates a timer which is set for a length of time determined by operating experience which yields maximum filter cake density of the required thickness. During this time interval, the motor operated valve to the second filter press is opened. Flow is established to the second filter press to compensate for low flow to the first filter press. The sum of the two flow rates maintains a constant interface level between aqueous fluids and settled solids in the tank. At the end of the time interval, the motor operated valve to the first filter press is closed. The filter press cake is dumped and the filter press cloth is manually cleaned if necessary. The filter press is then filled with water to make ready for a smooth on stream transition that will promote even cake distribution on the filter plates.

The control system provides a constant feed rate from the solids settling tank, even when switching filter presses. The need for a surge drum is eliminated by maintaining continuous up-stream and downstream operation of the sludge dewatering stage in a waste water treating process. The present invention is particularly adapted to concentrating sludge from a partial oxidation process. Partial oxidation processes are shown, for example, in U.S. Pat. Nos. 4,087,258; 4,402,709 and 4,466,810 all incorporated herein by reference. In particular, the sludge fed to the solids settling tank may be derived from the ash rich hydroclone bottoms stream of U.S. Pat. No. 4,474,584 incorporated herein by reference.

The principles, preferred embodiments and modes of operation of the present invention have been described in the foregoing specification. However, the invention which is intended to be protected is not to be construed as limited to the particular embodiments disclosed. The embodiments are to be regarded as illustrative rather than restrictive. Variations and changes may be made by others without departing from the spirit of the present invention. For example the functions of the timer, flow control switch, relay means and pressure switch means may individually or in any combination be accomplished by a programmable logic control network. Accordingly, it is expressly intended that all such variations and changes which fall within the spirit and scope of the present invention as defined in the following claims be embraced thereby.

What is claimed is:

1. A system for controlling the flow of settled solids from a solids settling tank to a pair of filter presses; filter press A and filter press B, the solids settling tank supplied with sludge consisting of solids and aqueous fluid; the system comprising:

A. a plurality of sensors comprising:
 1. a first sensor providing a signal corresponding to the sensed settled solids/aqueous fluid interface level, L, in the solids settling tank and providing a signal corresponding thereto,
 2. a second sensor sensing the total flow of settled solids from the solids settling tank, FT, to the filter presses and providing a signal corresponding thereto,
 3. a third pair of sensors sensing the pressure differential across each filter press, DPA being the pressure differential across filter press A and DPB being the pressure differential across filter press B, and providing signals corresponding thereto, B. a plurality of valves comprising:
 1. a pair of flow control valves for controlling the flow rate of settled solids to the filter presses, flow control valve A controlling the flow rate to filter press A receiving as an input flow control valve A activating signal, FSA, and flow control valve B controlling the flow rate to filter press B receiving as an input flow control valve B activating signal, FSB,
2. a pair of motor operated valves for blocking flow to the filter presses, motor operated valve A up-stream of flow control valve A and motor operated valve B up-stream of flow control valve B,
C. a flow controller receiving both signal, L, from the first sensor corresponding to a reference input and signal, FT, from the second sensor corresponding to a feedback variable and providing a flow control valve actuating signal, FS, proportional to the difference between the reference input and the feedback variable,
D. a relay means comprising two amplifying relays, relay x providing signal xxx and relay y providing signal yyy, the amplifying relays adjusting the respective signals such that as control valve actuating signal FS varies from 0% to 50%, signal xxx varies linearly from 0% to 100% and signal yyy remains constant at 0%; and as control valve actuating signal FS varies from 50% to 100%, signal xxx remains constant at 100% and signal yyy varies linearly from 0% to 100%;
E. a flow control switch receiving as inputs a flow control switch actuating signal, signal xxx from relay x and signal yyy from relay y; and in mode one providing signal xxx, as output signal FSA, and signal yyy, as output signal FSB, and in mode two providing signal xxx, as output signal FSB, and signal yyy, as output signal FSA, alternating between mode one and mode two on receipt of a flow control switch activating signal,
F. pressure switch means receiving as inputs, the signals corresponding to the pressure differential across each filter press, DPA and DPB, and at a predetermined pressure differential, providing as an output a timer actuating signal,
G. a timer receiving as an input the timer actuating signal and providing as outputs:
   i. an actuating signal to open the motor operated valve up-stream of the flow control valve receiving the varying control valve actuating signal,
   ii. an actuating signal; after a predetermined time period, to close the motor operated valve up-stream of the flow control valve receiving the constant control valve actuating signal, and simultaneously
   iii. the flow control switch actuating signal to the flow control switch.

* * * * *